(12) United States Patent
Bohizic et al.

(10) Patent No.: US 8,099,274 B2
(45) Date of Patent: Jan. 17, 2012

(54) FACILITATING INPUT/OUTPUT PROCESSING OF ONE OR MORE GUEST PROCESSING SYSTEMS

(75) Inventors: Theodore J. Bohizic, Hyde Park, NY (US); Richard T. Brandle, Dallas, TX (US); Ping T. Chan, Fishkill, NY (US); Michael S. Cirulli, Poughkeepsie, NY (US); Paul M. Gioquindo, Poughkeepsie, NY (US); Ying-Yeung Li, Poughkeepsie, NY (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 11/693,896

(22) Filed: Mar. 30, 2007

(65) Prior Publication Data

US 2008/0243465 A1    Oct. 2, 2008

(51) Int. Cl.
*G06F 17/50* (2006.01)
*G06F 9/44* (2006.01)
*G06F 6/455* (2006.01)
*G06F 9/46* (2006.01)

(52) U.S. Cl. ............ 703/23; 703/13; 703/24; 703/25; 718/1; 718/100; 718/102; 718/103; 718/104; 718/105; 718/106; 718/107; 718/108

(58) Field of Classification Search ........... 703/13, 703/23–25; 718/1, 100–108
See application file for complete search history.

(56) References Cited

U.S. PATENT DOCUMENTS

| | | | | |
|---|---|---|---|---|
| 5,488,716 A | * | 1/1996 | Schneider et al. ............ | 714/10 |
| 5,844,986 A | * | 12/1998 | Davis ........................... | 713/187 |
| 5,974,049 A | | 10/1999 | Ratcliff et al. | |
| 6,345,241 B1 | * | 2/2002 | Brice et al. .................... | 703/21 |
| 6,466,962 B2 | * | 10/2002 | Bollella ........................ | 718/107 |
| 6,658,459 B1 | * | 12/2003 | Kwan et al. ................... | 709/217 |
| 6,862,735 B1 | * | 3/2005 | Slaughter et al. ............. | 719/315 |
| 6,934,945 B1 | * | 8/2005 | Ogilvy ............................ | 718/1 |
| 6,961,941 B1 | * | 11/2005 | Nelson et al. ................. | 719/319 |
| 6,976,083 B1 | | 12/2005 | Baskey et al. | |

(Continued)

OTHER PUBLICATIONS

Ghodke, Ninad. "Virtualization Techniques to Enable Transparent Access to Peripheral Devices Across Networks", Jul. 2004.*

(Continued)

*Primary Examiner* — Kamini S Shah
*Assistant Examiner* — Shambhavi Patel
(74) *Attorney, Agent, or Firm* — John E. Campbell; Kevin P. Radigan, Esq.; Heslin Rothenberg Farley & Mesiti P.C.

(57) ABSTRACT

An article of manufacture, method and system are provided for facilitating input/output (I/O) processing of at least one guest processing system. The article of manufacture includes at least one computer-usable medium having computer-readable program code logic to facilitate the I/O processing of the at least one guest processing system. The computer-readable program code logic when executing performing the following: emulating on a native system an I/O architecture for the at least one guest processing system, the emulating including: providing multiple device managers for a plurality of I/O devices of the I/O architecture; providing at least one communications adapter process interfacing the multiple device managers to the at least one network driver process; and wherein the multiple device managers translate I/O messages in at least one guest processing system format to messages in native system format for processing by the at least one communications adapter process, thereby facilitating I/O processing.

32 Claims, 9 Drawing Sheets

U.S. PATENT DOCUMENTS

| | | | |
|---|---|---|---|
| 6,978,233 B1 | 12/2005 | Burns | |
| 7,072,824 B2 | 7/2006 | Halcomb et al. | |
| 7,158,927 B2 | 1/2007 | Traut | |
| 7,260,820 B1* | 8/2007 | Waldspurger et al. | 718/1 |
| 7,302,683 B2* | 11/2007 | Ogilvy | 718/1 |
| 7,478,388 B1* | 1/2009 | Chen et al. | 718/1 |
| 7,484,210 B2* | 1/2009 | Lewites et al. | 718/1 |
| 7,546,599 B2* | 6/2009 | Nesher et al. | 718/1 |
| 7,558,723 B2* | 7/2009 | Traut | 703/24 |
| 7,606,868 B1* | 10/2009 | Le et al. | 709/211 |
| 2002/0143842 A1* | 10/2002 | Cota-Robles et al. | 709/1 |
| 2003/0093649 A1 | 5/2003 | Hilton | |
| 2005/0076324 A1* | 4/2005 | Lowell et al. | 717/100 |
| 2005/0268071 A1* | 12/2005 | Blandy et al. | 711/208 |
| 2005/0289246 A1* | 12/2005 | Easton et al. | 710/1 |
| 2006/0253894 A1* | 11/2006 | Bookman et al. | 726/2 |
| 2007/0074192 A1* | 3/2007 | Geisinger | 717/148 |
| 2007/0271559 A1* | 11/2007 | Easton et al. | 718/1 |
| 2008/0126614 A1* | 5/2008 | Ooi et al. | 710/38 |

OTHER PUBLICATIONS

Adams, et al. "A Comparison of Software and Hardware Techniques for x86 Virtualization", ACM 2006.*

IBM Publication, "z/Architecture—Principles of Operation," SA22-7832-04, Fifth Edition, Sep. 2005, (pp. 3-47-3-53; 13-1-17-29).

IBM Publication, "OSA-Express Customer's Guide and Reference", Chapter 1. Introducing OSA-Express and OSA-Express2, 2003-2006 (pp. 3-10).

M.E. Baskey et al., "zSeries Features for Optimized Sockets-Based Messaging: HiperSockets and OSA-Express", IBM Technical Bulletin, vol. 48, Nos. 4/5 (2002).

* cited by examiner

FACILITATING INPUT/OUTPUT PROCESSING OF ONE OR MORE GUEST PROCESSING SYSTEMS

TECHNICAL FIELD

This invention relates in general to the field of computer system emulation, and more particularly, to facilitating input/output (I/O) processing of one or more guest processing systems by emulating on a native system an I/O architecture for the guest processing system(s).

BACKGROUND OF THE INVENTION

The resurgence of the mainframe class processing environment has created an increased desire for software developers to write applications for the mainframe environment. Discouraging this effort is the high cost of such an environment for development and training purposes. Emulation is one solution to this dilemma. Emulation is the process whereby a native system (for example, a generalized processor, such as a UNIX or LINUX-based workstation) is programmed to provide a more specialized processor architecture of a guest system (e.g., a z/Architecture® system offered by International Business Machines Corporation, Armonk, N.Y.). This solution advantageously provides a much lower cost of ownership of the product for pursuing application development.

SUMMARY OF THE INVENTION

The concepts presented herein support the above-noted effort by facilitating input/output (I/O) processing of at least one guest processing system on a native system by emulating on the native system an I/O architecture for the at least one guest processing system. More specifically, provided herein, in one aspect, is an article of manufacture that includes at least one computer-usable medium having computer-readable program code logic to facilitate I/O processing of at least one guest processing system. The computer-readable program code logic when executing performing, for instance, the following: emulating on a native processing system an I/O architecture for the at least one guest processing system, wherein emulating the I/O architecture includes: providing multiple device managers for a plurality of I/O devices of the I/O architecture; providing at least one communications adapter process interfacing the multiple device managers to at least one network driver process; and wherein the multiple device managers translate I/O messages in at least one guest processing system format to messages in native system format for processing by the at least one communications adapter process, thereby facilitating I/O processing of the at least one guest processing system.

In another aspect, a method of facilitating I/O processing of at least one guest processing system is provided which includes: emulating on a native processing system an I/O architecture for the at least one guest processing system. The emulating of the I/O architecture includes: providing multiple device managers for multiple I/O devices of the I/O architecture; providing at least one communications adapter process interfacing the multiple device managers to at least one network driver process; and wherein the multiple device managers translate I/O messages in at least one guest processing system format to messages in native system format for processing by the at least one communications adapter process, thereby facilitating I/O processing of the guest processing system.

In a further aspect, a system is provided for facilitating I/O processing of at least one guest processing system. The system includes a processing environment comprising an emulator for emulating, at least in part, an I/O architecture for facilitating I/O processing of at least one guest processing system. The emulator includes: an emulator I/O interface; multiple device managers for a plurality of I/O devices of the I/O architecture being emulated, wherein a separate device manager is provided for each I/O device of the plurality of I/O devices of the I/O architecture; multiple message queues, each message queue being associated with a respective device manager of the multiple device managers; at least one communications adapter process interfacing the multiple device managers to at least one network driver process; and wherein the multiple device managers translate I/O messages in at least one guest processing system format to messages in native system format for processing by the at least one communications adapter process, and thereby facilitate I/O processing of the at least one guest processing system.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for facilitating input/output (I/O) processing of at least one guest processing system by emulating on a native system an I/O architecture for the at least one guest processing system. Numerous aspects of I/O architecture emulation are described and claimed herein with reference, by way of example, to the z/Architecture® offered by International Business Machines Corporation, Armonk, N.Y.

An adapter, in the data processing sense of the word, is conventionally a hardware device which is used to communicate between a host system and one or more external devices. Thus, an adapter is seen to provide one form of input/output connectivity in a data processing system. The present invention is described herein, though not exclusively, with reference to what is referred to the Open Systems Adapter (OSA), a product offered by International Business Machines Corporation, Armonk, N.Y. This adapter provides a protocol for data transmission between a host system memory and a data network. Even more particularly, the data network to which this protocol is directed is a local area network (LAN).

Conventionally, the open systems adapter employs a QDIO protocol. Queues direct input/output (QDIO) was introduced in 1990, and is a state of the art I/O architecture which provides fast host-to-LAN communication. An example of a system that employs this protocol is seen in U.S. Pat. No. 6,976,083, issued to the Assignee of the present invention. The QDIO architecture is also described in Volume 46, Numbers 4/5, 2002 of the IBM Journal of Research and Development.

As noted initially, emulation technology is becoming more prevalent in the industry due to the rising cost of hardware development, especially on high-end systems. The resurgence of the mainframe class machine has created an increased interest for code developers to write applications for this type of machine. One of the most significant ones of the high-end systems is the z/Series® of data processor manufactured and marketed by International Business Machines Corporation.

Unfortunately, the cost of these high-end systems is discouraging program writers and designers from working in this area, especially for development and training purposes. Although attempts have been made to provide z/Series® processor emulations that run on either UnixWare or LINUX-based workstations, there is an increasing desire to emulate other parts of the system, including DASD, coupling, I/O architecture, and networking functions. The present invention is directed to meeting this need for I/O architecture emulation for, for example, the z/Series® I/O architecture.

Figure 1:
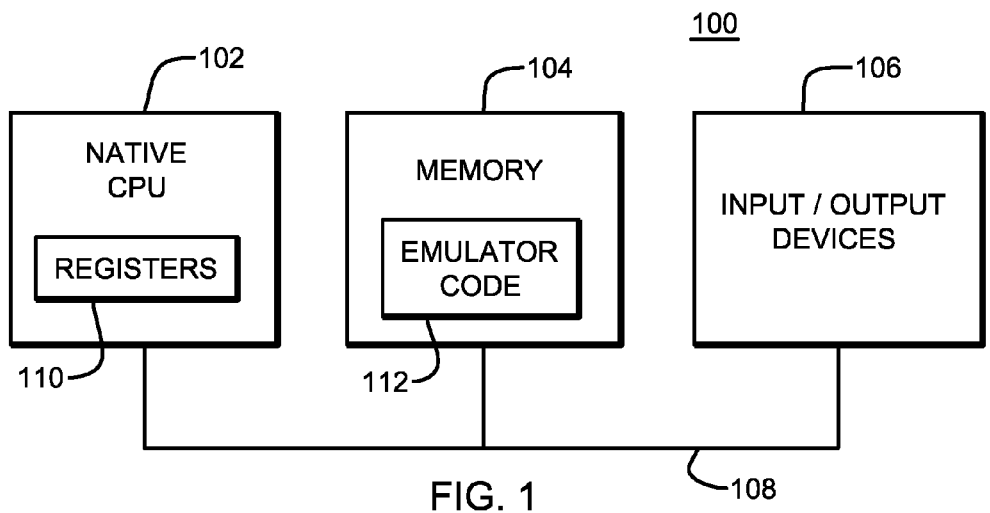
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes emulator code 112 stored in memory 104. This code enables the processing environment configured in one architecture to emulate another architecture. For instance, emulator code 112 allows machines based on architectures other than the z/Architecture®, such as pSeries® servers, to emulate the z/Architecture® and to execute software and instructions developed based on the z/Architecture®.

Figure 2:
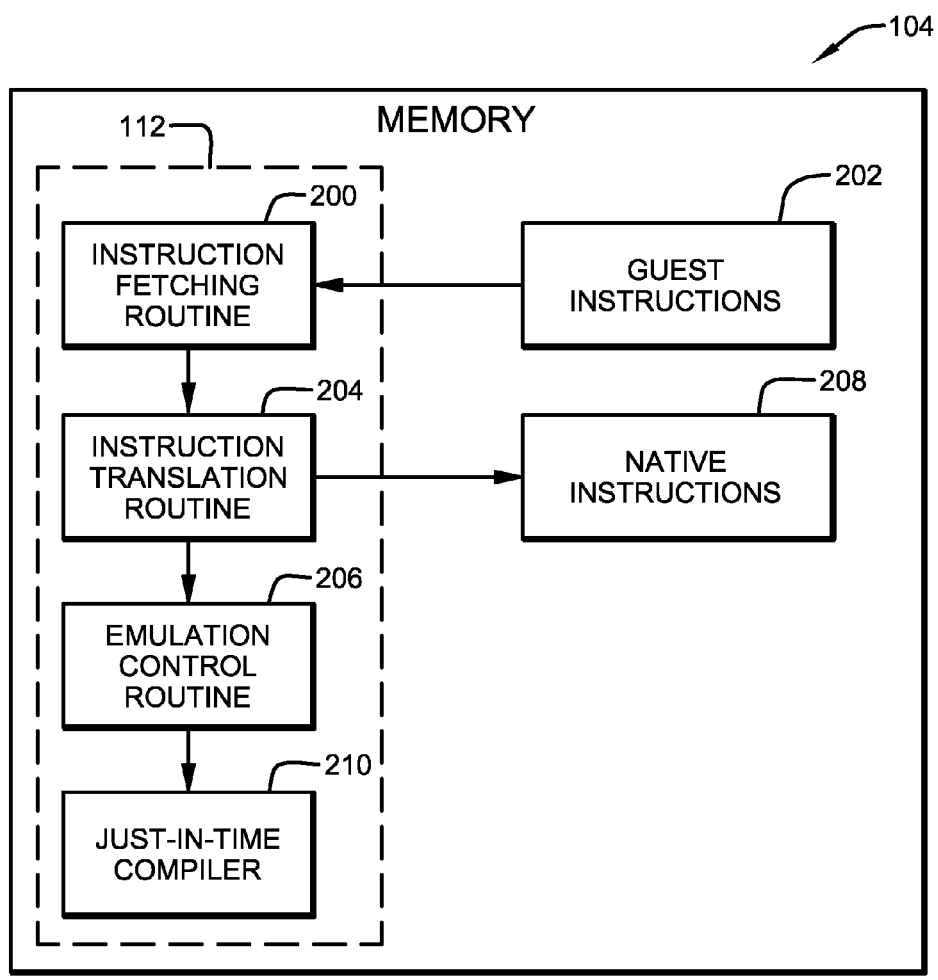
FIG. 2 depicts further details of one embodiment of the memory of FIG. 1, in accordance with one or more aspects of the present invention.

Further details relating to emulator code 112 (a.k.a., emulator) are described with reference to FIG. 2. In one example, emulator code 112 includes an instruction fetching routine 200 to obtain one or more guest instructions 202 from memory 104, and to optionally provide local buffering for the one or more obtained instructions. Guest instructions 202 comprise software instructions (e.g., machine instructions) that were developed to be executed in an architecture other than that of native CPU 102. For example, guest instructions 202 may have been designed to execute on a z/Architecture® processor, but are instead being emulated on native CPU 102, which may be, for instance, a pSeries® server.

Emulator 112 also includes an instruction translation routine 204 to determine the type of guest instruction that has been obtained and to translate the guest instruction into one or more corresponding native instructions 208. This translation includes, for instance, identifying the function to be performed by the guest instruction and choosing the native instructions to perform that function.

Further, emulator 112 includes an emulation control routine 206 to cause the native instructions to be executed. Emulation control routine 206 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 202, native instructions 208, and emulation code 112 may reside in the same memory or may be dispersed among different memory devices.

An accumulation of instructions that have been processed by the fetch and control routines is further provided, in one embodiment, to a Just-In-Time compiler 210. The Just-In-Time compiler is a dynamic compiler that examines the instructions, looks for opportunities to remove redundancies and generates a matching sequence of instructions on the native platform on which the emulator is running. While the emulator has visibility to one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y. JAVA is a trademark of Sun Microsystems, Inc., Santa Clara, Calif.

Emulator 210 includes a number of components used to emulate an architecture that differs from the native architecture. In this embodiment, the CPU and I/O architecture being emulated is the z/Architecture® offered by IBM®, but other architectures may be emulated as well. The emulation enables a guest operating system 212 (e.g, z/OS®, a registered trademark of International Business Machines Corporation) to execute on the native architecture and enables the support of one or more guest applications 214 (e.g., Z applications). Further details regarding emulator 210 are described with reference to FIG. 3.

Figure 3:
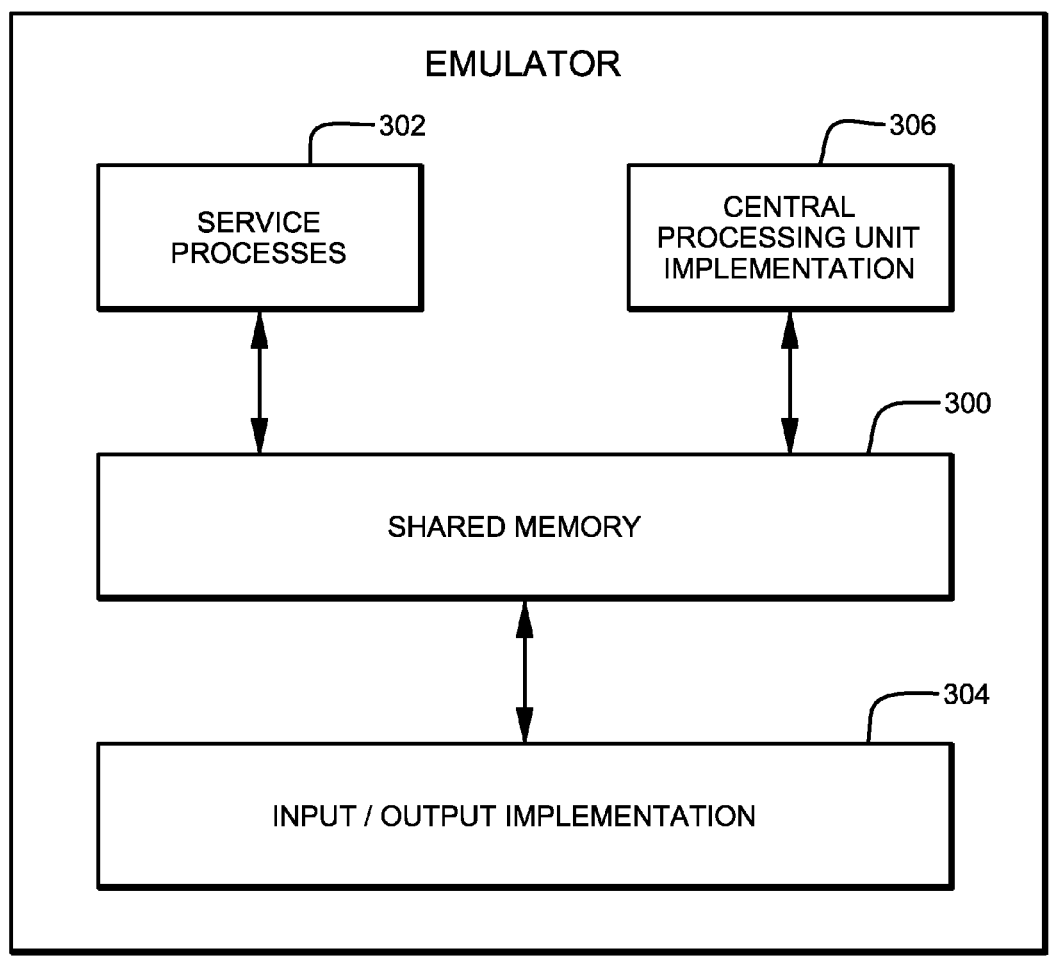
FIG. 3 depicts further details of one embodiment of an emulator interfacing a guest processing system and a native processing system running on a native hardware architecture, in accordance with an aspect of the present invention.

Referring to FIG. 3, emulator 210 includes a shared memory 300 coupled to one or more service processes 302, an input/output (I/O) implementation 304, and a central processing unit (CPU) implementation 306, each of which is described in further detail below.

Shared memory 300 is a representation of a portion of memory in the host that is visible from service processes 302, I/O implementation 304, and CPU implementation 306. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 302 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 304 includes, for instance, one or more subchannel processes and an I/O controller used to communicate with I/O devices. The I/O controller is responsible for starting the subchannel processes and performing recovery, in one aspect of the present invention. Central processing unit (CPU) implementation 306 is responsible for executing instructions and managing the processing.

FIGS. 4-9 depict embodiments of approaches for facilitating input/output (I/O) processing of one or more guest processing systems employing I/O architecture emulation on a native system. In these I/O architecture emulation figures, "host" refers to the native system and/or a guest system, either of which may employ the emulated I/O architecture. FIGS. 4-9 depict, by way of example only, I/O architecture emulation for the z/Series® I/O architecture offered by International Business Machines Corporation, Armonk, N.Y.

Figure 4:
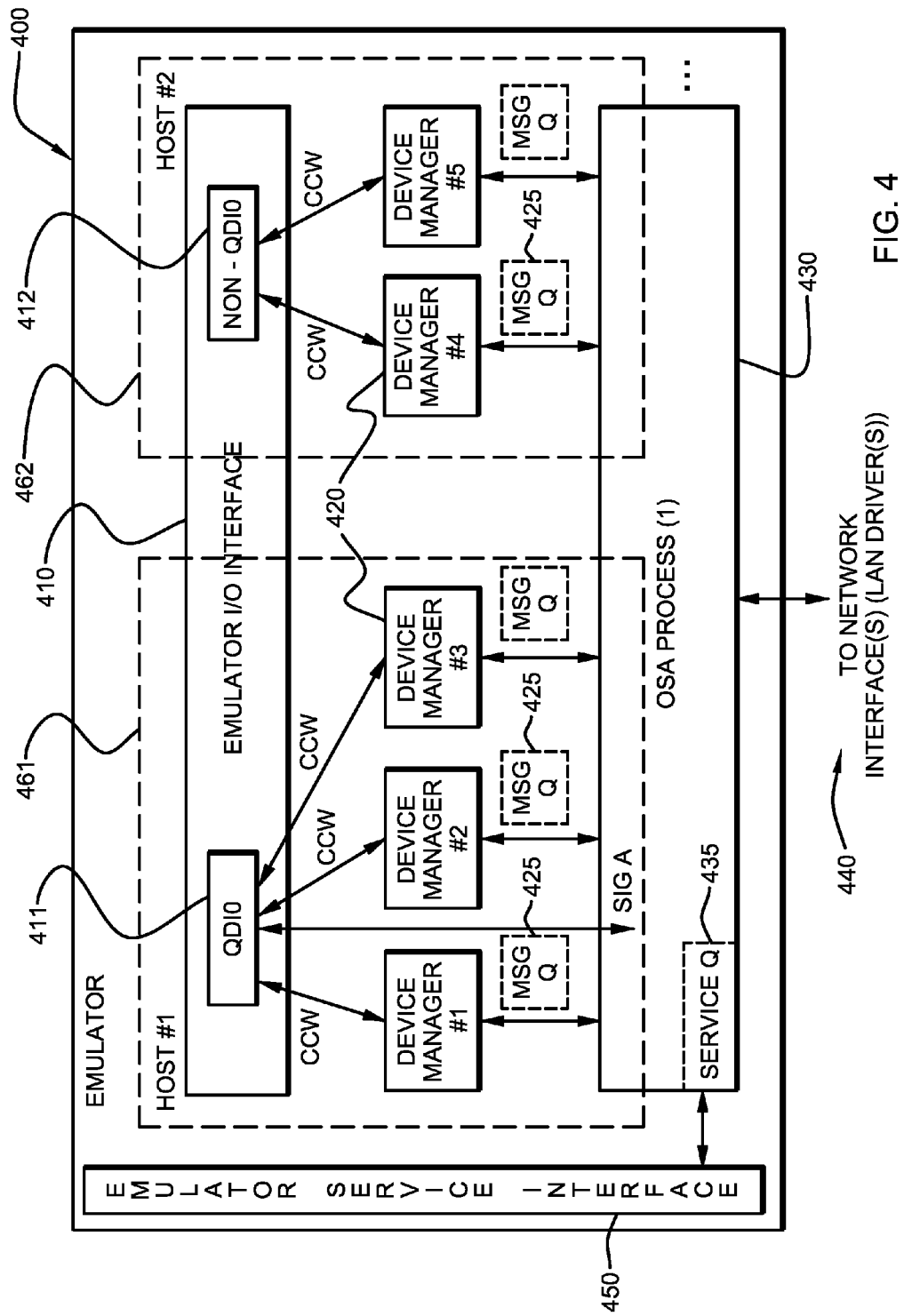
FIG. 4 depicts a further embodiment of an emulator showing details of input/output architecture emulation, in accordance with an aspect of the present invention.

FIG. 4 depicts one embodiment of a software structure 400 that emulates I/O hardware for a z/Series® processing environment employing one or more open systems adapters (OSAs). Emulator 400 includes an emulator I/O interface 410 accommodating both queued direct input/output (QDIO) work 411 and non-QDIO work 412. Emulator I/O interface 410 interfaces with a plurality of device managers 420, which in turn communicate with one or more Open Systems Adapter (OSA) process(es) 430. For each I/O device for the I/O architecture being emulated, a separate device manager 420 is provided. Device managers 420 provide a capability to translate I/O messages in one or more guest processing system formats to message in native system format for processing by one or more OSA processes (i.e., the one or more communications adapter processes). A message queue 425 is employed for each respective device manager of the multiple device managers 420 to facilitate passage of messages in native system format to the one or more OSA processes 430.

Emulator 400 further includes an emulator service interface 450 which communicates with each OSA process 430 via a dedicated service queue 435 assigned to each OSA process. The emulator service interface is described further below with reference to the recovery procedure for starting or restarting OSA emulation. Each OSA process 430 communicates with one or more network interfaces such as drivers 440. In one example, the network interface is a local area network.

FIG. 4 depicts a software structure that provides an exact emulation of an I/O architecture such as a z/Series® I/O architecture employing Open Systems Adapters (OSA). The OSA function may run as a single UNIX® process in both the IBM AIX® and Intel LINUX environments. With the emulated I/O architecture will be one or more LAN adapters on, for example, an AIX® platform that provides any hardware assists presently available on the z/Series® mainframe. For this implementation, each OSA chpid communicates with one or more LAN adapters provided by the workstation that runs the emulator software. An OSA chpid (or chpid) includes both an OSA process and one or more device manager (DM) processes. By way of example, FIG. 4 depicts a single chpid that includes OSA process (1) and DM processes #1-5. This chpid may be employed by multiple hosts, sequentially or simultaneously, as illustrated. In one implementation, the emulated I/O architecture comprises multiple chpids.

In the above description of a chpid running in a z/Architecture emulation environment, the OSA process communicates with a host TCP/IP or SNA stack via a group of DM processes, with one device manager process being provided for each I/O device of the I/O architecture. In the example of FIG. 4, three DM processes 420 of the illustrated chpid are employed for a host processing system 461 utilizing QDIO TCP/IP stacks 411, while two DM processes 420 are utilized for SNA and non-QDIO communication stacks 412 of a host processing system 462. Whether a QDIO TCP/IP stack or SNA or non-QDIO communications stack is employed, channel command words (CCWs) are utilized to communicate through a series of message queues with the communications adapter process. The CCWs have associated well known names to the system, and different sets of CCWs are employed across the QDIO versus non-QDIO connections. A read and write message queue, associated with a DM control write device process and a DM control read device process may exist per OSA chpid process. Each CCW is processed in order off of the associated message queue 425 and responses (such as status of the CCWs) may be returned on a read queue of a DM process functioning as a control read device. Traffic off the LAN also reaches the host via the read queue. The OSA process communicates to a default OSA LAN driver (native to LINUX or AIX®) via a standard LAN driver interface provided by the native operating system.

Each device manager 420 employs one or more translation tables to translate respective CCW messages into native system format for processing by the emulated OSA process. These tables can be readily derived by one of ordinary skill in the art utilizing published information on the z/Series® I/O architecture, including, for example, the above-incorporated z/Architecture Principles of Operation.

The following listings illustrate this translation by providing examples of code for a CCW protocol message received at a device manager process, as well as code for a native system message format sent from the device manager process.

DM Message Receive Format:

```
typedef struct
{
long int mtype; /* message type (aka. device#) */
unsigned short mreqtype; /* request type from CP */
unsigned char mcmd; /* CCW command to be translated */
unsigned char mflags; /* CCW Flags */
int mcount; /* No. of bytes to transfer */
char mtext[8]; /* message text */
}OSAMSG_t;
```

DM Message Send Format:

```
typedef struct
{
long int device_number; /* aka message type */
unsigned short req_type; /* request type to or from OSA */
unsigned char channel_status;
unsigned char device_status;
unsigned short residual_count; /* Number of bytes that didnot xfer */
unsigned short transfer_count; /* How many bytes in the message */
char mtext[8]; /* data to go back */
}DMMSG_t;
```

By way of further example, the following listing is a partial example of command translation code for a device manager converting CCW to a native system format for processing by an OSA process in an emulated z/Series® I/O architecture.

Command Translation Code:

```
#define ASYNC_STATUS 0xF000
#define OSA_PCI 0xF001
#define SET_QDIO_ACTIVE 0xF002
#define SET_QDIO_INACTIVE 0xF003 /* reset qdio active */
//Msg ID awsosa send to OSA to indicate cleanup and sync up
#define OSA_CLEANUP 0xCCCC
typedef struct
{
BYTE Flags;
#define CU_Init_Status 0x80
/* When this bit is on the channel function will solicit
/* status from the control unit function
#define CU_End_Status 0x40
/* This bit when one, indicates that the data transfer is complete
/* that the channel must solicit ending status from the control
/* unit. If it is zero, ending status
/* is taken from the final status field of the CDT entry.
#define CU_Get_Buffers 0x20
/* This bit when one, indicates that the channel must allocate new
/* SGL and LDS data buffers. This bit is normally on for
/* a write operation.
#define CU_Special_Cmd 0x10
/* This bit when one, indicates that the command is special. That */
/* is, it is a valid command, but not used in the mainline path. */
/* a write operation. */
BYTE Init_Status;
BYTE Final_Status;
BYTE CU_Flags; /* special flags for the CU */
} CDT_ENTRY;
typedef struct
{
CDT_ENTRY Entry[256];
} CDT;
#define CU_Invalid 0x01 /* Invalid command indicator */
#define CU_IntvReq 0x02 /* intervention required cond*/
#define CU_Sense 0x04 /* sense command */
#define CU_Tools 0x08 /* tools CCW. */
#define CU_RstEvt 0x10 /* resetting event CDT. */
#define CU_QDIO 0x20 /* QDIO special command. */
#define CU_ATN 0x80 /* attention. */
#define CU_SMF 0x40 /* status modifier */
#define CU_CUE 0x20 /* control unit end */
#define CU_BSY 0x10 /* busy */
#define CU_CE 0x08 /* channel end */
#define CU_DE 0x04 /* device end. */
#define CU_UC 0x02 /* unit check */
#define CU_UE 0x01 /* unit exception. */
```

Figure 5:
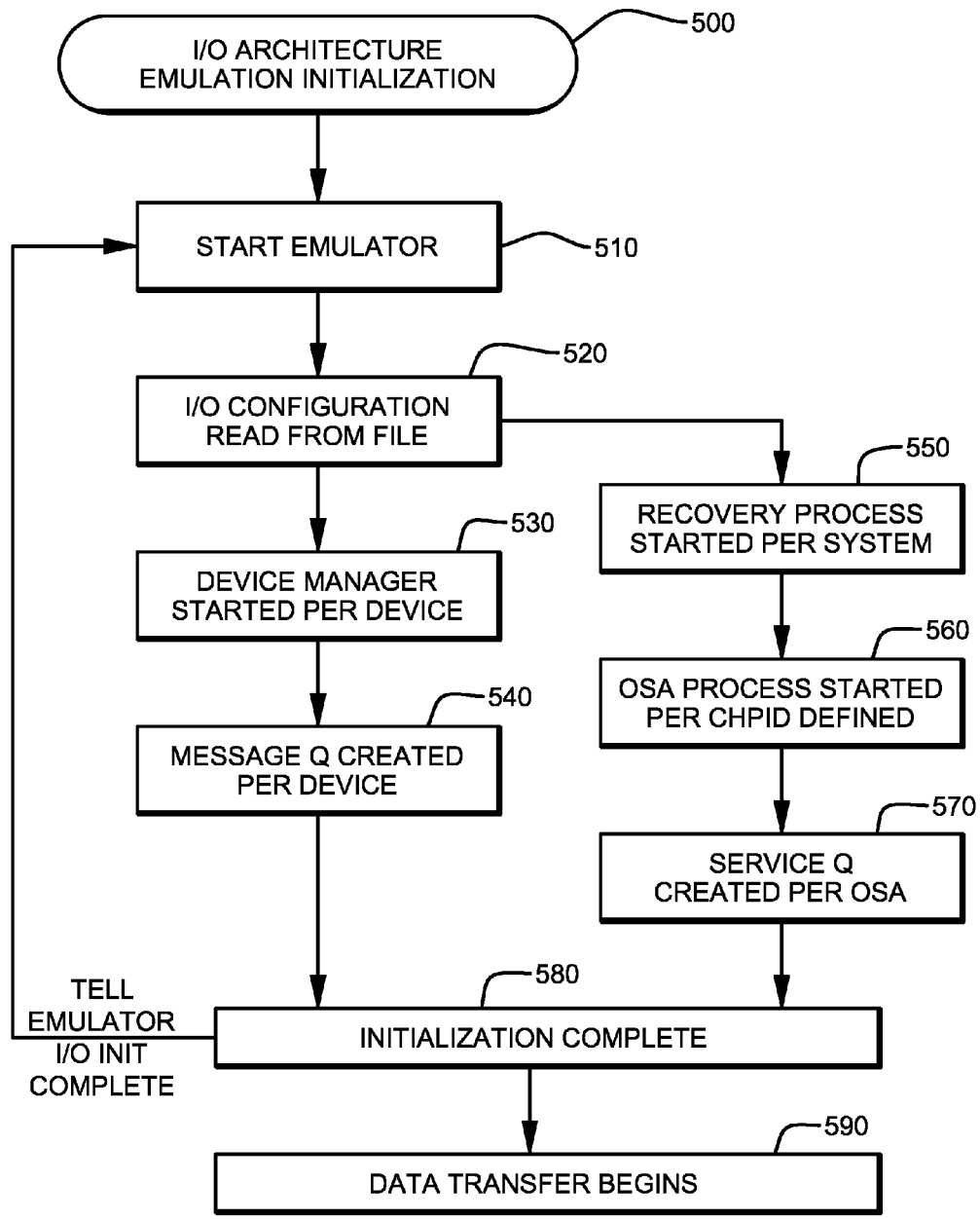
FIG. 5 is a flowchart of one embodiment for initializing the input/output architecture emulation of FIG. 4, in accordance with an aspect of the present invention.

FIG. 5 is a flowchart of one embodiment of processing for I/O architecture emulation initialization 500, in accordance with an aspect of the present invention. An emulator is started 510 which is followed by reading I/O configuration from a definition file 520. The definition file may contain customer preset I/O definitions. By way of example, Table 1 depicts a simplified definitions file for a z/Series® I/O architecture.

TABLE 1

Name awsosa 18 path = pathtype=osd
Device 600
Device 601
Device 602
Device 603
Device 60a OSA OSA unitadd=fe
Name awsosa 19 path = pathtype=ose
Device 700
Device 701
Device 70a OSA OSA unitadd=fe
...

In this sample definitions file, only the I/O portion is depicted. OSD represents a QDIO chpid, while OSE is a non-QDIO chpid. Path refers to the chpid number, while device refers to the device manager number, with each device statement representing one instance of a device manager.

The emulator starts a device manager instance for each I/O device defined in the definitions file 530. A service queue is then allocated for each device manager 540.

Commensurate with starting the device managers, the emulator initiates the recovery process per system 550. The recovery process is described further below with reference to FIGS. 8 & 9. Essentially, the recovery process initiates an OSA process for each chpid defined in the definitions file 560. A service queue is then created or allocated for each OSA process instance 570. The allocated service queue is for all service requests to the OSA process instance. Upon completion of setup of the queues, initialization is finished 580 and the emulator is informed that the I/O initialization portion of the I/O architecture emulation is complete. After this, data transfer may begin 590 employing the emulated I/O architecture.

Figure 8:
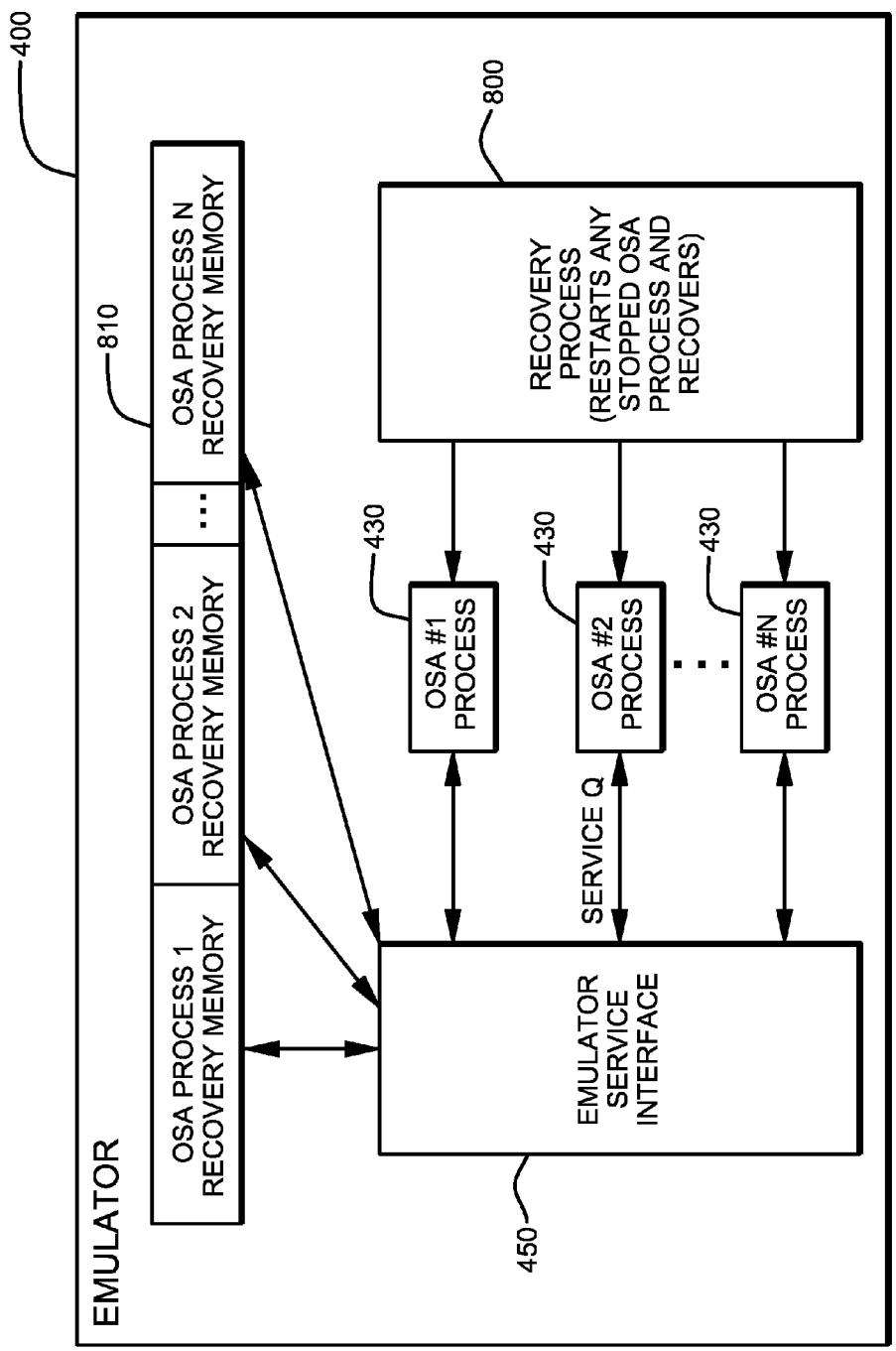
FIG. 8 depicts a further embodiment of the emulated I/O architecture of FIG. 4, and illustrating a common recovery process for restarting a stopped communications adapter interface, in accordance with an aspect of the present invention.
Figure 9:
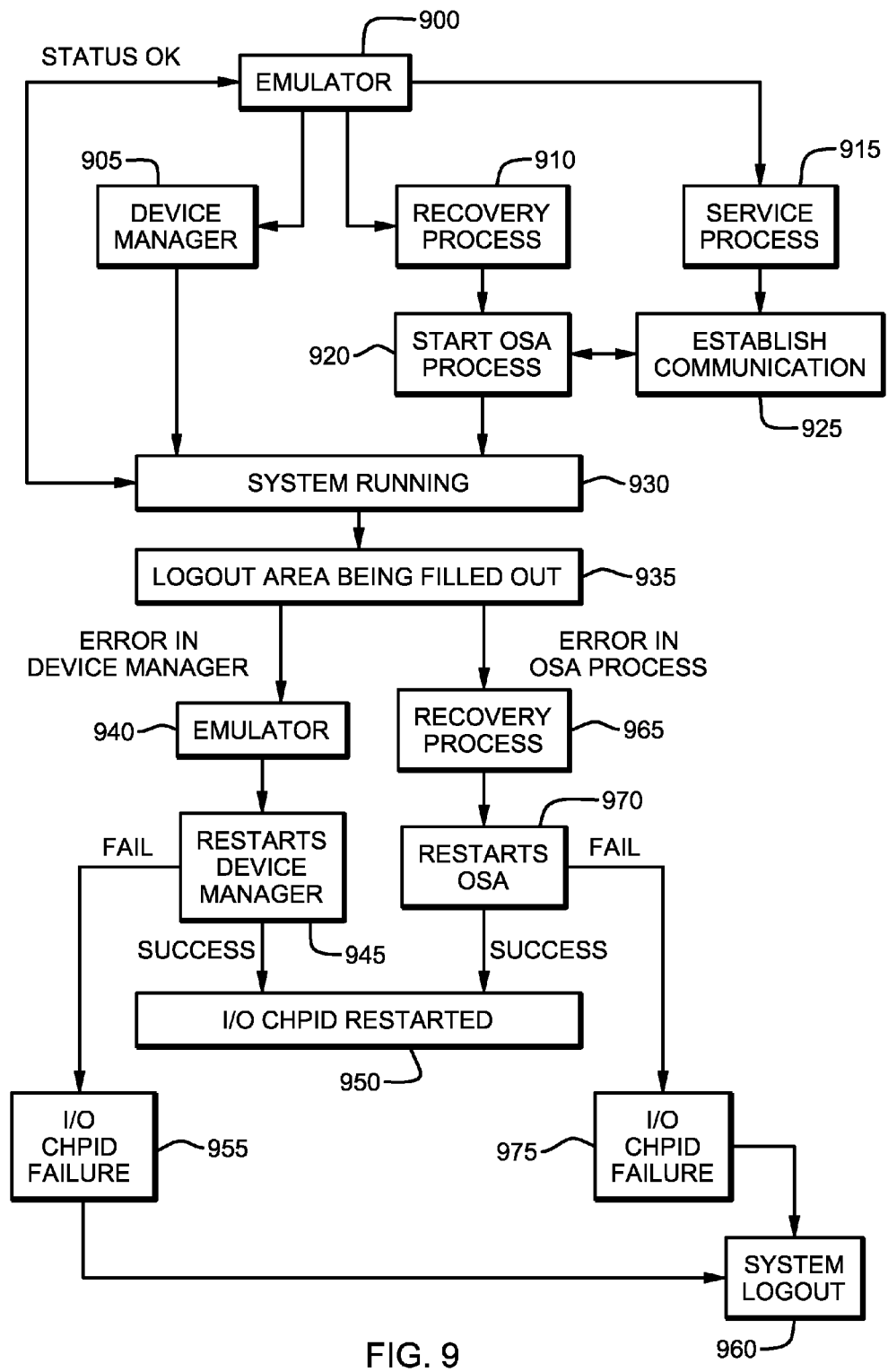
FIG. 9 is a flowchart of one embodiment of I/O architecture emulation and I/O subsystem restart processing, in accordance with an aspect of the present invention.

In one initialization embodiment, a 256-entry chpid directory is created in shared memory (e.g., in log out area 935 of FIG. 9). All chpids register the information in Table 2 on chpid initialization. Additionally, device specific OSA information such as depicted in Table 3 is saved (e.g., in OSA process recovery memory 810 of FIG. 8). The Table 2 & 3 information is used during subsequent recovery processing.

TABLE 2

| IO_Chpic_Directory_Header (layout 512 bytes) |
| --- |
| chpid Type (2 bytes) chpid State (2 bytes) Code Version (4 bytes) Slot # (2 bytes) Port # (2 bytes) Card # (4 bytes) chpid # (2 bytes) Interface # (2 bytes) Interface Name (12 bytes) Device Specific Information (480 bytes) |

TABLE 3

| OSA_Specific Layout (480 bytes) |
| --- |
| Function Mask (4 bytes) Recovery Function Mask (4 bytes) |
| Siga Vector Location Identifier (8 bytes) |
| IOP Lite chpid Process ID (8 bytes) OSA chpid Process ID (8 bytes) |
| Recovery chpid Process ID (8 bytes) HSA Location Identifier (8 bytes) |
| Siga Process ID (8 bytes) Service Process ID (8 bytes) |
| CCA Location Identifier (8 bytes) |
| OSA Trace Location (8 bytes) OSA Log Location (8 bytes) |
| OSA Logout Location (8 bytes) OSA Function Supported Mask (8 bytes) |
| Config. File Name (128 bytes) |
| 240 Bytes Reserved |

Prior to creation of a chpid process, the definitions file is parsed. This is performed by a master I/O process of the emulator which creates all the necessary control blocks for the chpids in a shared memory area, for example, to mimic the HSA on a z/Series® I/O architecture. The memory region for each chpid is defined to a specific shared memory region (name), to protect other chpids from accessing HSA outside of its chpid.

Once the definitions file has been parsed, and all HSA control blocks for all chpids have been built, the individual chpid processes are created. One "parent" process is created for each defined chpid. From the parent chpid process, the OSA processes can be created as child processes to the main chpid process. The DM processes are created from the CPU emulation initialization process. This design is believed to assist in error recovery scenarios. A "heartbeat" message may be used between the parent chpid process and the DM and OSA processes to detect "hang" conditions. If an "append" occurs, a signal (sigchild) may be sent to the parent chpid process to signal the "append". This signal can be used by the parent to "log out" the information for the OSA or for DM process as explained further below in connection with FIGS. 8 & 9.

The parameters passed to the chpid process at creation time include the chpid number. All other OSA shared memory names can be derived via the chpid number.

The I/O recovery process and I/O chpid process may be identified by a look-up in the shared chpid directory, aspects of which are depicted in the detailed example of Tables 4-8 below for a z/Architecture I/O emulation.

TABLE 4

| Chpid Type | Value |
| --- | --- |
| Real I/O - Escon | 0x03 |
| CTC | 0x08 |
| Pacer | 0x06 |
| Byte Pacer | 0x05 |
| Emulated I/O | 0x1F |
| OSD | 0x11 |
| OSE | 0x10 |
| OSC | 0x14 |

TABLE 5

| Chpid State Mask | Value |
| --- | --- |
| UnDefined - not in use | 0x0000 |
| Defined - in use - defined in IOCDS | 0x0001 |
| PCI Card Identified | 0x0002 |
| Definition Error | 0x0004 |
| Interface Found | 0x0008 |
| Northpole Card Found | 0x0010 |
| OSA Card Found | 0x0020 |
| Recovery Process Started | 0x0100 |
| chpid Process Ready | 0x8000 |

TABLE 6

| Function Mask (for OSA) | Value |
| --- | --- |
| ARP_ASSIST | 0x00000001 |
| INBOUND_CHECKSUM_PROCESSING | 0x00000002 |
| OUTBOUND_CHECKSUM_PROCESSING | 0x00000004 |
| IP_FRAGMENTATION_REASSEMBLY | 0x00000008 |
| BROADCAST_FILTERING | 0x00000010 |
| IP_V6_SUPPORT | 0x00000020 |
| MULTICAST_ASSIST | 0x00000040 |
| BROADCAST_ASSIST | 0x00000080 |
| ARP_INFO_SUPPORT | 0x00000100 |
| ARP_STATS_SUPPORT | 0x00000200 |
| SETADAPTERPARMS_ASSIST | 0x00000400 |
| VLAN_ASSIST | 0x00000800 |
| PASSTHRU_ASSIST | 0x00001000 |
| FLUSH_ARP_SUPPORT | 0x00002000 |
| FULL_VLAN_SUPPORT | 0x00004000 |
| FORCE_INBOUND_PASSTHRU | 0x00008000 |

TABLE 7

| Recovery Mask | Value |
| --- | --- |
| Basic Recovery | 0x00000001 - chpid x-stop |
| Reserved | All other values |

TABLE 8

| Parms |
| --- |
| OSA Recovery Process |
| Chpid # From IOCDS Parsing Code OSA Chpid Process |
| Chpid # |

From the above Tables, note that OSA configuration name points to a file on a hard drive where all OSA parameters that need to be saved across resets, such as MAC Address, trace mask, etc. are stored. Allocation to shared memory locations causes a registry entry to be created. The interface number is only used for OSA. The interface name in ascii with 0x00 termination is used. For example, "np4m0", "np4m1", etc. for np, or "ent0", "ent1", etc. for OSA. If both the chpid_state_np_card bit and the chpid_state_osa_card bit are zero, the chpid is neither np nor osa.

Figure 6:
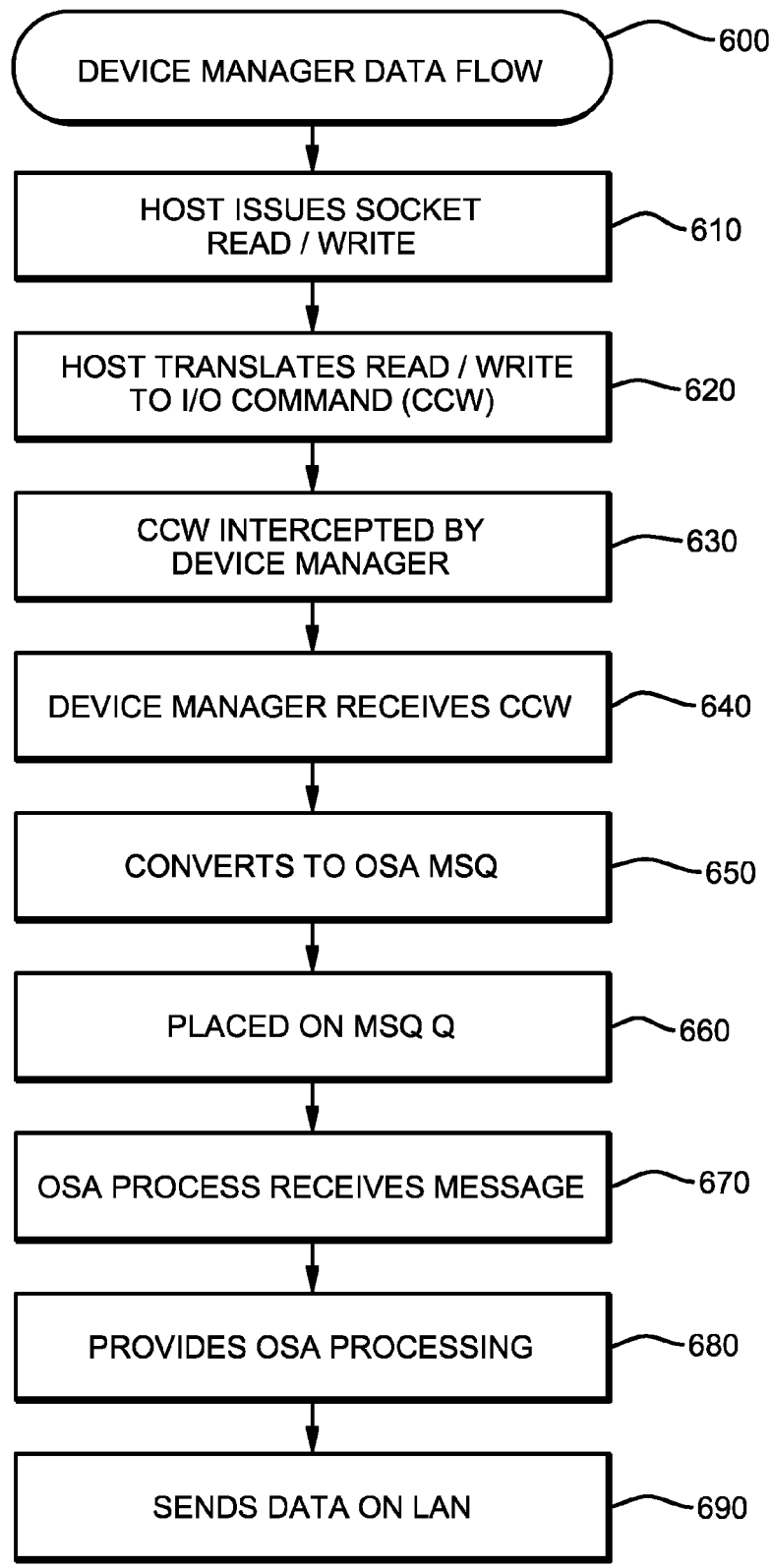
FIG. 6 is a flowchart of one embodiment of dataflow processing of one device manager of the multiple device managers of FIG. 4, in accordance with an aspect of the present invention.

FIG. 6 depicts one embodiment of device manager data flow 600, in accordance with an aspect of the present invention. In this flow, a host process is assumed to issue a socket read/write command 610, which is translated by the host process into an I/O command or message, such as a CCW command 620. The CCW command is intercepted by the device manager 630, through, for example, a QDIO stack or non-QDIO stack of the emulated processor. The device manager receives the CCW 640 and converts the CCW command to an OSA message 650. This OSA message is then placed on the associated message queue 660. The OSA process receives the message from the device manager's associated message queue 670 and provides OSA processing 680 responsive to the message. Data is then sent out onto an associated LAN pursuant to the OSA processing 690.

For inbound data, the device manager process receives data from the LAN (via the OSA processing), and adds the CCW command words needed to package the data into a message for forwarding to the appropriate TCP/IP stack of the emulated processor. The emulated processor reads the message off this TCP/IP stack and passes it to a VTAM protocol level that converts it back to socket read/write data.

As a specific example of the data flow process, a host operating system issues a socket read/write, and the underlying I/O protocol for the host operating system (i.e., VTAM) translates the socket read/write to an I/O program (i.e., command) containing CCWs. Channel command words are a well known protocol format arising from the IBM processor 360/370 architecture. This CCW message is intercepted by the emulator and passed to the appropriate QDIO or non-QDIO stack of the emulated processor. The data and command are then retrieved and translated into a message entry by the appropriate device manager process. Specifically, a signal, such as SIGUSR2, is used to tell the device manager process that a new message and data are waiting in the QDIO or non-QDIO stack. The DM process takes the message, and translates it for passage to the appropriate OSA process, which completes processing of the data and package to be sent on to the LAN.

Figure 7:
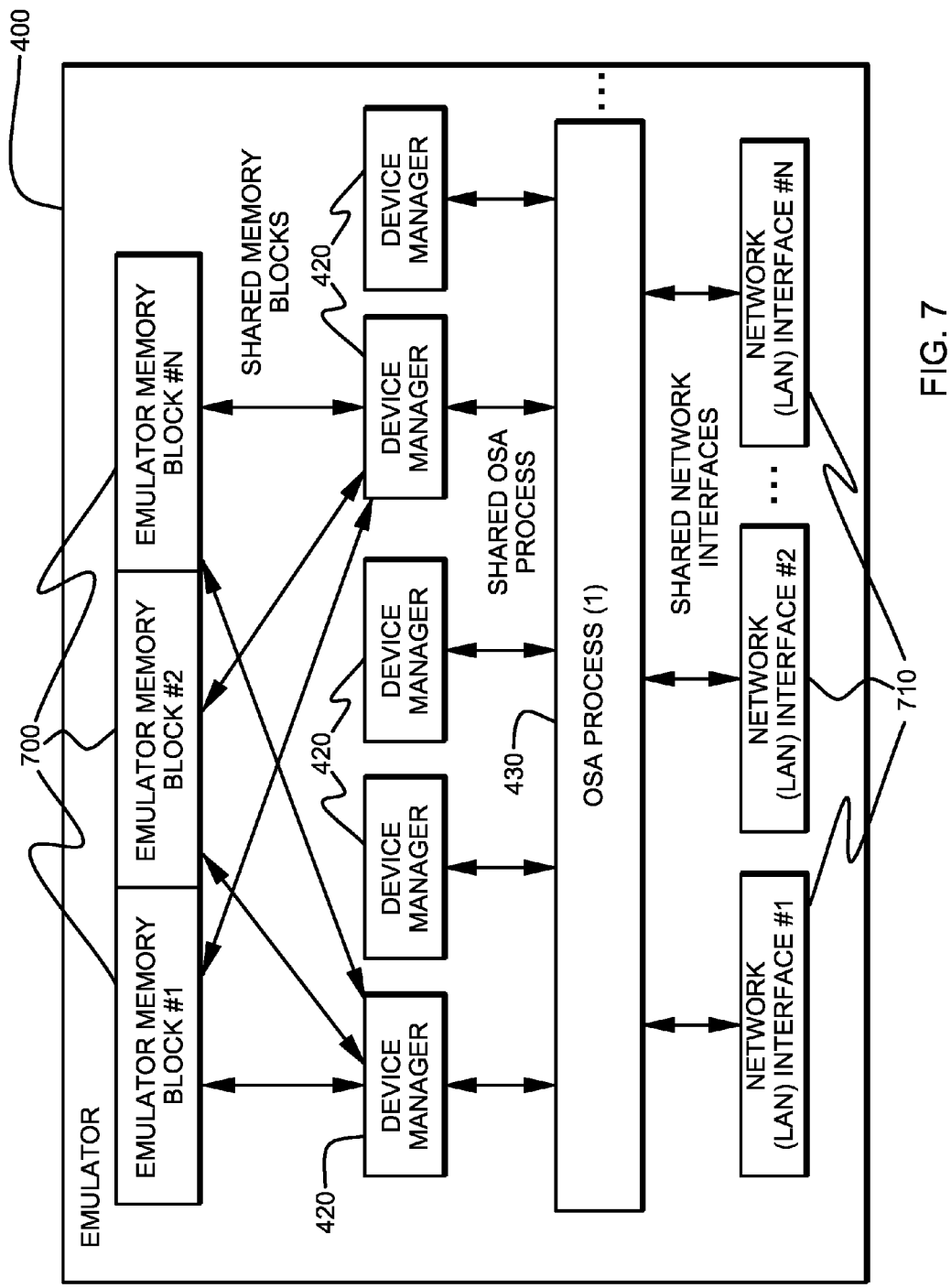
FIG. 7 depicts a further embodiment of the emulated I/O architecture of FIG. 4, and illustrating the sharing capabilities of various processes of the emulated I/O architecture, in accordance with an aspect of the present invention.

FIG. 7 depicts another aspect of an emulator 400, in accordance with an aspect of the present invention. Emulator 400 again includes multiple device managers 420 coupled to one or more OSA processes 430, as described above in connection with FIG. 4. The emulator further includes multiple isolated memory blocks 700 and multiple network (LAN) interfaces 710. In accordance with an aspect of the present invention, in one embodiment the multiple isolated emulated memory blocks 700 are each accessible by each device manager process 420, meaning that the isolated memory blocks are shareable by the device manager processes. Similarly, each OSA process accesses multiple shared network interfaces, that is, network (LAN) interfaces 710. Thus, from a single device manager, any emulator memory block 700 may be accessed, as well as any network interface 710. This sharing of memory blocks and LAN interfaces is contrary to a conventional OSA-based I/O architecture.

Conventionally, a hardware OSA-based I/O architecture is limited to talking to instances of the host operating system or LAN that is connected physically to the OSA adapter. This restricts the amount of storage or LAN connectivity that a particular OSA can have when connected to a z/Series® machine. Under the emulated I/O architecture of FIG. 7, the OSA can share across any number of host operating systems, and more significantly, across several LAN instances as well. This presents a number of possible connectivity advantages over z/Series® I/O hardware machine. Because this new OSA is emulated, any LAN interface or hardware physical layer (wireless capability, for example) can be immediately shared (versus a conventional OSA being for Ethernet only). A routing layer can be created that would provide connectivity between ports and host instances in both layer 2 (physical layer) or layer 3 (application layer) environments.

By way of example, a shared storage segment may be allocated for each z/emulator process. This will allow access to the data from external z/Series® processes (e.g., CEC dump, MANOP, system event, etc.). Table 9 depicts one example of a configuration table for shared memory for device manager processes of an OSA-based emulated I/O architecture.

TABLE 9

| Area Name/Reason | Size |
| --- | --- |
| Siga Vector | 256 bytes - allocated by osa_main |
| Siga Vector Mapping Table | 256 bytes - allocated and filled out by osa_main |
| I/O Chpid Block | 128K per system - allocated and filled out by osa_main |
| Trace | 1 Meg. - allocated by OSA |
| Log | 256K - allocated by OSA |
| Logout Data | 512K - allocated by OSA |
| Channel Control Blocks | Allocated by DM Init Process |

Possible signal use for the DM processes and OSA processes described herein are set out in Table 10.

TABLE 10

| Signals Name | Purpose |
| --- | --- |
| SIGALRM | Command line Process and CHSC (DM) |
| SIGUSR1 | QDIO |
| SIGUSR2 | DM <-> OSA Communication |
| SIGIO | Lan Driver |

Note that SIGUSR1 maybe used for "CP-chpid" operations for both OSA and real I/O (where CP refers to the processor), while SIGUSR2 may be used for "IOP-chpid" operations for both OSA and real I/O.

By way of further detail, each chpid may allocate shared memory blocks to be used for tracing and logging. A total of 1.75 Mbytes may be allocated per chpid to perform these tasks. The OSA trace (Table 9) may be a 1 Mbyte circular trace with a same format as employed in the current z/Series® I/O architecture. Each entry may consist of a 32-byte entry, a trace code, followed by a timestamp, and then six 4-byte user-defined fields. The 256 Kbyte log is another circular trace of "important events", with the same format as the trace. A logout data area (Table 9, and see FIG. 9) may be a 512 Kbyte area that contains all stats and operational parameters managed by the OSA hardware in a conventional I/O architecture. Presently, this information resides in local program storage, but is moved in accordance with the emulation presented herein to facilitate debugging and information gathering.

Tables 9 & 10 describe the allocation routines and processes to use these areas. The command line functions, also described in Tables 9 & 10, are the basis for debugging configuration of the OSA process. These commands fall into two categories. Commands that need to talk to a chpid's shared memory locations exclusively, and those that require a tap to the OSA process to perform a certain operation. Each command's behavior is also described in the tables.

FIG. 8 illustrates the robust recovery process for the emulation of an I/O architecture, in accordance with an aspect of the present invention. As shown, emulator 400 again includes multiple OSA processes 430 which interface with an emulator service interface 450. A shared logout area 810 is illustrated wherein each OSA process has a dedicated recovery memory area, as discussed above. Recovery process logic 800, which is described further below with reference to FIG. 9, is code for automatically transparently attempting restart of any stopped OSA process. Presently, OSA hardware only allows a failing OSA to manage and recover itself. In this new emulated I/O architecture, a new recovery paradigm is introduced wherein OSA recovery process 800 oversees the entire OSA infrastructure in the system and can perform recovery actions, such as port switching or hot host back-up, that are not present today in a z/Series® OSA hardware environment. New data transport mechanisms could also be employed using this recovery capability. Link aggregation or stripping could be easily set up. In addition, since the overall OSA process is integrated into the CPU and emulator base, then should a failure happen, an error log could be easily generated that gathers all OSA and CPU data. Employing an emulated I/O architecture as presented herein removes existing constrains on the amount of logging memory and capabilities provided to a z/Series® OSA. Depending on the failure, all data may be automatically synchronized with the CPU data gathered and provided to service personnel for data analysis.

FIG. 9 is an overview flowchart illustrating initialization and recovery logic, in accordance with an aspect of the present invention. As shown, an emulator 900 initiates one or more device managers 905, the recovery process (of FIG. 8) 910, as well as the service process 915 (i.e., emulator service interface of FIG. 8). The recovery process then starts one or more OSA processes 920 and connection is established between the one or more OSA processes and the service process 925 using the service queues created for the OSA processes (see FIGS. 4 & 5). This completes initialization and the one or more I/O subsystems (e.g., chpids) are up and running 930. Once running, a status signal is returned to the emulator to signal availability for processing I/O commands. While running, the individual recovery process memories per chpid (see FIG. 8) are periodically updated with running state information 935, that is, the recovery information is dynamically saved and managed as the I/O system is running.

Should one or more device manager and/or OSA processes fail (for example, hang due to code error or device error or interface error), then if a device manager error occurs, the CPU emulator 940 attempts restart of the device manager process 945 using the recorded state information in logout area 935. Assuming that the restart attempt is successful, then the I/O subsystem or chpid is successfully restarted and running 950, that is, assuming that only the device manager failed. If the restart is unsuccessful, then an I/O subsystem or chpid failure signal 955 is sent, and I/O subsystem logout data for the failing I/O chpid is saved 960. If an error has occurred in the OSA process (again, for example, as a result of code error, device error or interface error), then the recovery process code attempts restarting of the one or more effected OSA processes 970. There may be multiple failures occurring within the OSA processes and/or the device manager processes. Assuming that the restart is successful, then the I/O subsystem or chpid is running 950, and provides a new status OK signal to the emulator that it is running and able to accept I/O commands. If the restart of the OSA process is unsuccessful, then the subject I/O subsystem (i.e., chpid) has failed 975 and while the I/O architecture emulation continues running, all logout information for the affected I/O subsystem is saved 960 for future gathering and analysis of the I/O failure.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 10:
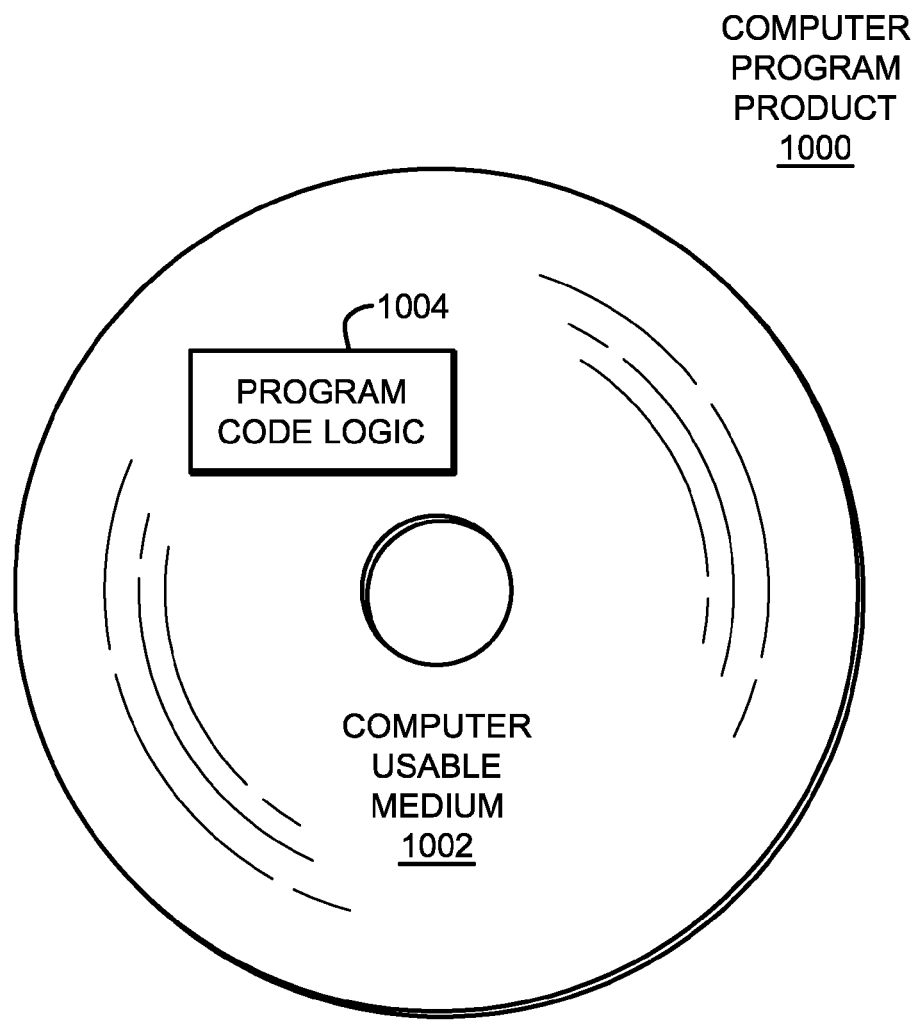
FIG. 10 depicts one embodiment of a computer program product to incorporate one or more aspects of the present invention.

One example of an article of manufacture or a computer program product incorporating one or more aspects of the present invention is described with reference to FIG. 10. A computer program product 1000 includes, for instance, one or more computer usable media 1002 to store computer readable program code means or logic 1004 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a data structure of readily accessible units of memory is provided. By employing this data structure, memory access and system performance are enhanced (e.g., faster). The data structure includes designations (e.g., addresses) of one or more units of memory (e.g., pages) that while in the data structure do not need address translation or any other test to be performed in order to access the unit of memory. This data structure can be used in any type of processing environment including emulated environments.

Although various embodiments are described above, these are only examples. For instance, one or more aspects of the present invention can be included in environments that are not emulated environments. Further, one or more aspects of the present invention can be used in emulated environments that have a native architecture that is different than the one described above and/or emulates an architecture other than the z/Architecture®. Various emulators can be used. Emulators are commercially available and offered by various companies. Additional details relating to emulation are described in *Virtual Machines: Versatile Platforms For Systems and Processes (The Morgan Kaufmann Series in Computer Architecture and Design)*, Jim Smith and Ravi Nair, Jun. 3, 2005, which is hereby incorporated herein by reference in its entirety.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As used herein, the term "obtaining" includes, but is not limited to fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating input/output (I/O) processing of at least one guest processing system, the computer program product comprising:
    a tangible storage medium readable by a processor and storing instructions for execution by the processor to perform a method comprising:
        emulating on a native system an I/O architecture for the at least one guest processing system, wherein emulating the I/O architecture comprises:
            providing multiple device managers, the multiple device managers emulating a plurality of I/O devices of the emulated I/O architecture, wherein the multiple device managers receive I/O command messages of the at least one guest processing system, the I/O command messages being in at least one guest processing system format;
            providing at least one emulated communications adapter interfacing the multiple device managers to at least one network driver process of the native system external to the emulated I/O architecture, the at least one emulated communications adapter providing a protocol for data transmission from the emulated I/O architecture to the at least one network driver process; and
            wherein the multiple device managers translate the received I/O command messages in the at least one guest processing system format to messages in native system format and provide the messages in native system format for processing by the at least one emulated communications adapter, thereby facilitating I/O processing of the at least one guest processing system.

2. The computer program product of claim 1, wherein providing the multiple device managers comprises providing a separate device manager for each I/O device of the plurality of I/O devices of the emulated I/O architecture.

3. The computer program product of claim 2, wherein the emulating further comprises providing multiple message queues, each message queue being associated with a respective device manager of the multiple device managers, the multiple message queues facilitating passage of the messages in native system format to the at least one emulated communications adapter.

4. The computer program product of claim 1, wherein the multiple device managers translate I/O command messages in multiple guest processing system formats to messages in native system format for processing by the at least one emulated communications adapter.

5. The computer program product of claim 4, wherein the I/O command messages in multiple guest processing system formats are translated by the multiple device managers into messages in native system format for processing by a common communications adapter process of the at least one emulated communications adapter.

6. The computer program product of claim 4, wherein the I/O command messages in multiple guest processing system formats comprise channel command words (CCWs) in queued direct input/output (QDIO) protocol format and CCWs in non-QDIO protocol format.

7. The computer program product of claim 6, wherein the multiple device managers translate the I/O command messages in multiple guest processing system formats to messages in native system format for processing by a common communications adapter process of the at least one emulated communications adapter, the common communications adapter process being an Open Systems Adapter (OSA) process.

8. The computer program product of claim 1, wherein the emulating further comprises providing multiple network driver interfaces accessible via the at least one emulated communications adapter, and wherein the multiple device managers share the multiple network driver interfaces across the at least one emulated communications adapter.

9. The computer program product of claim 1, wherein the at least one guest processing system comprises memory partitioned into multiple isolated memory blocks, and wherein the emulating comprises allowing each device manager of the multiple device managers access to each memory block of the multiple isolated memory blocks.

10. The computer program product of claim 1, wherein the emulating further comprises:
    initializing I/O architecture emulation by:
        initializing the multiple device managers by obtaining configuration information from a defined input/output configuration directory;
        creating a message queue for each initialized device manager;
        initializing the at least one emulated communications adapter;
        creating a service queue for each at least one emulated communications adapter, the service queue being accessible via an emulator service interface; and
        signaling completion of the initializing after which I/O command messages in the at least one guest processing system format may be received for translation at the multiple device managers.

11. The computer program product of claim 1, wherein the I/O command messages in at least one guest processing system format comprise channel command words (CCWs), and wherein the emulating further comprises intercepting by a device manager at least one CCW, translating the at least one CCW to at least one message in native system, format for processing by the at least one emulated communications adapter, placing the at least one message in native system format on a message queue associated with the device manager, receiving the at least one message in native system format at the at least one emulated communications adapter via the message queue, and providing communications adapter processing of the at least one message in native system format at the at least one emulated communications adapter and thereafter, sending data out from the at least one emulated communications adapter to a network interface.

12. The computer program product of claim 1, wherein the at least one emulated communications adapter and at least one of the multiple device managers forms at least one I/O subsystem of the emulated I/O architecture, and wherein the emulating further comprises for each I/O subsystem of the at least one I/O subsystem, periodically saving to memory recovery information on the state of the I/O subsystem, and transparently recovering from a failure at the I/O subsystem employing the periodically saved recovery information for the I/O subsystem.

13. The computer program product of claim 12, wherein the transparently recovering comprises restarting a failing emulated communications adapter or device manager of the I/O subsystem to a saved state at time of failure thereof.

14. The computer program product of claim 13, wherein the at least one I/O subsystem is at least one chpid, and wherein the at least one emulated communications adapter thereof is at least one open systems adapter (OSA) process.

15. A method of facilitating input/output (I/O) processing of at least one guest processing system, the method comprising:
    emulating on a native system an I/O architecture for the at least one guest processing system, wherein emulating the I/O architecture comprises:
        providing multiple device managers, the multiple device managers emulating a plurality of I/O devices of the emulated I/O architecture, wherein the multiple device managers receive I/O command messages of the at least one guest processing system, the I/O command messages being in at least one guest processing system format;
        providing at least one emulated communications adapter interfacing the multiple device managers to at least one network driver process external to the emulated I/O architecture; and
        wherein the multiple device managers translate the received I/O command messages in the at least one guest processing system format to messages in native system format and provide the messages in native system format for processing by the at least one emulated communications adapter, thereby facilitating I/O processing of the at least one guest processing system.

16. The method of claim 15, wherein providing the multiple device managers comprises providing a separate device manager for each I/O device of the plurality of I/O devices of the emulated I/O architecture.

17. The method of claim 16, wherein the emulating further comprises providing multiple message queues, each message queue being associated with a respective device manager of the multiple device managers, the multiple message queues facilitating passage of the messages in native system format to the at least one emulated communications adapter.

18. The method of claim 15, wherein the multiple device managers translate I/O command messages in multiple guest processing system formats to messages in native system format for processing by the at least one emulated communications adapter, and wherein the I/O command messages in multiple guest processing system formats are translated by the multiple device managers into messages in native system format for processing by a common communications' adapter process of the at least one emulated communications adapter.

19. The method of claim 18, wherein the I/O command messages in multiple guest processing system formats comprise channel command words (CCWs) in queued direct input output (QDIO) protocol format and CCWs in non-QDIO protocol format.

20. The method of claim 18, wherein the multiple device managers translate the I/O command messages in multiple guest processing system formats to messages in native system format for processing by a common communications adapter process of the at least one emulated communications adapter, the common communications adapter process being an Open Systems Adapter (OSA) process.

21. The method of claim 15, wherein the emulating further comprises providing multiple network driver interfaces accessible via the at least one emulated communications adapter, and wherein the multiple device managers share the multiple network driver interfaces across the at least one emulated communications adapter.

22. The method of claim 15, wherein the at least one guest processing system comprises memory partitioned into multiple isolated memory blocks, and wherein the emulating comprises allowing each device manager of the multiple device managers access to each memory block of the multiple isolated memory blocks.

23. The method of claim 15, wherein the emulating further comprises:
    initializing I/O architecture emulation by:
        initializing the multiple device managers by obtaining configuration information from a defined input/output configuration directory;
        creating a message queue for each initialized device manager;
        initializing the at least one emulated communications adapter;
        creating a service queue for each at least one emulated communications adapter, the service queue being accessible via an emulator service interface; and
        signaling completion of the initializing after which I/O command messages in the at least one guest processing system format may be received for translation at the multiple device managers.

24. The method of claim 15, wherein the I/O command messages in at least one guest processing system format comprise channel command words (CCWs), and wherein the method further comprises intercepting by a device manager at least one CCW, translating the at least one CCW to at least one message in native system format for processing by the at least one emulated communications adapter, placing the at least one message in native system format on a message queue associated with the device manager, receiving the at least one message in native system format at the at least one emulated communications adapter via the message queue, and providing communications adapter processing of the at least one message in native system format at the at least one emulated communications adapter and thereafter, sending data out from the at least one emulated communications adapter to a network interface.

25. The method of claim 15, wherein the at least one emulated communications adapter and at least one of the multiple device managers forms at least one I/O subsystem of the emulated I/O architecture, and wherein the method further comprises for each I/O subsystem of the at least one I/O subsystem, periodically saving to memory recovery information on the state of the I/O subsystem, and transparently recovering from a failure at the I/O subsystem employing the periodically saved recovery information for the I/O subsystem.

26. The method of claim 25, wherein the transparently recovering comprises restarting a failing emulated communications adapter or device manager of the I/O subsystem to a saved state at time of failure thereof, and wherein the at least one I/O subsystem is at least one chpid, and wherein the at least one emulated communications adapter comprises at least one open systems adapter (OSA) process.

27. A system of facilitating input/output (I/O) processing of at least one guest processing system, the system comprising:
- a processing environment comprising an emulator for emulating, at least in part, an I/O architecture, the emulator comprising:
  - an emulator I/O interface;
  - multiple device managers, the multiple device managers emulating a plurality of I/O devices of the emulated I/O architecture, wherein a separate device manager is provided for each I/O device of the plurality of I/O devices of the emulated I/O architecture, and wherein the multiple device managers receive I/O command messages of the at least one guest processing system, the I/O command messages being in at least one guest processing system format;
  - multiple message queues, each message queue being associated with a respective device manager of the multiple device managers;
  - at least one emulated communications adapter interfacing the multiple device managers to at least one network driver process external to the emulated I/O architecture; and
  - wherein the multiple device managers translate the received I/O command messages in at least one guest processing system format to messages in native system format and provide the messages in native system format for processing by the at least one emulated communications adapter, thereby facilitating I/O processing of the at least one guest processing system.

28. The system of claim 27, wherein the multiple device managers translate I/O command messages in multiple guest processing system formats to messages in native system format for processing by the at least one emulated communications adapter.

29. The system of claim 27, wherein the emulator further comprises multiple network driver interfaces accessible via the at least one emulated communications adapter, and wherein the multiple device managers share the multiple network driver interfaces across the at least one emulated communications adapter.

30. The system of claim 27, wherein the at least one guest processing system comprises memory partitioned into multiple isolated memory blocks, and wherein the emulator allows each device manager of the multiple device managers access to each memory block of the multiple isolated memory blocks.

31. The system, of claim 27, wherein the at least one emulated communications adapter and at least one of the multiple device managers forms at least one I/O subsystem of the emulated I/O architecture, and wherein the system further comprises for each I/O subsystem of the at least one I/O subsystem, means for periodically saving to memory recovery information on the state of the I/O subsystem, and for transparently recovering from a failure at the I/O subsystem employing the periodically saved recovery information for the I/O subsystem.

32. The system of claim 31, wherein the means for transparently recovering comprises means for restarting a failing emulated communications adapter or device manager of the I/O subsystem to a saved state at time of failure thereof, and wherein the at least one I/O subsystem is at least one chpid, and wherein the at least one emulated communications adapter comprises at least one open systems adapter (OSA) process.

* * * * *